June 9, 1942.   W. P. GAGE   2,285,920
POLYMERIZATION OF OLEFINS WITH PHOSPHORIC ACID CATALYST
Filed June 5, 1939
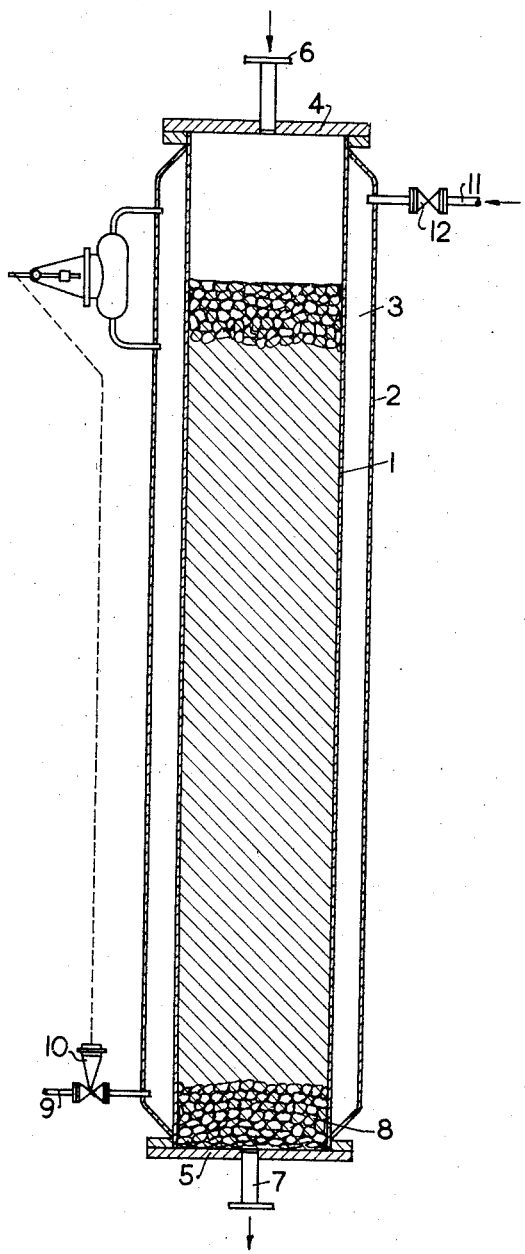
Inventor: William P. Gage
By His Attorney:

Patented June 9, 1942

2,285,920

UNITED STATES PATENT OFFICE 2,285,920

POLYMERIZATION OF OLEFINS WITH PHOSPHORIC ACID CATALYST

William P. Gage, Deer Park, Tex., assignor to Shell Development Company, San Francisco, Calif., a corporation of Delaware Application June 5, 1939, Serial No. 277,447

7 Claims. (Cl. 260—683)

This invention relates to improvements in the process for polymerizing normally gaseous olefins, and more particularly to improvements in the polymerization of olefins having two to five carbon atoms under high pressure with a solid phosphoric acid catalyst.

Catalytic polymerization of olefins with $H_3PO_4$ catalysts at low pressure is a well known process but has the disadvantages that the reaction rates are comparatively slow, that catalyst life, even in the absence of catalyst poisons and under best achievable temperature control, is notably short, and that the amount of catalyst expended per pound of polymerized product is relatively large, requiring regeneration by burning with its well known disadvantages.

It has already been proposed to carry out the polymerization with the aid of such catalysts at higher pressures in order to speed up the reaction. However, although this high pressure polymerization of olefins with $H_3PO_4$ catalysts may have been accomplished on a laboratory scale, certain disadvantages of this method of polymerization have caused it to fail on a commercial scale. I have found that the reasons for this failure are as follows: Because of the higher rate of reaction and greater density of the olefins, in the high pressure polymerization, a very great amount of heat is liberated in the reaction zone in a given time, making temperature control quite difficult, and causing rises in temperature which very seriously curtail the life of the catalyst through carbonization. Moreover, peak temperatures or localization of the temperature rises in the bed are of much greater magnitude than in the low pressure polymerization and are correspondingly more difficult to control.

It is an object of this invention to provide a method whereby normally gaseous olefins may successfully be polymerized at pressures exceeding about 600 pounds per square inch. It is a purpose of the invention to do this in such a way that heat developed is rapidly carried away so as to prevent rapid catalyst carbonization. Another purpose is to provide a process in which a longer catalyst life is obtained in comparison with comparable processes heretofore available. A further purpose of this invention is to conduct the polymerization in relatively inexpensive and simple apparatus.

As has been pointed out, the failure of the commercial scale process has been due mainly to lack of temperature control of this reaction in which the heat evolution per unit volume per unit time is very high. To overcome this difficulty I have found that certain limitations of dimensions of the catalyst chamber are essential to the correct control of the reaction, unless certain artificial means are employed whose effect will be described later. The catalyst chamber should be an elongated shell preferably of circular cross-section with a maximum distance from any point within the bed to the nearest cooling surface within the limits of from 2 to 3 inches, and having a length of from 20 to 60 feet.

The figure of the drawing is a sectional elevation of a catalyst bed chamber of the instant invention.

The true effect of elevated superatmospheric pressures on the phosphoric acid polymerization was heretofore not known exactly. It was widely believed that the use of high pressure in this type of polymerization would lead to over-polymerization and formation of tarry material, and, therefore, pressures much in excess of about 300 to 500 pounds per square inch were not generally recommended for the purpose. However, my investigation has proved this notion of excessive formation of highly condensed, tarry material at elevated pressures to be entirely incorrect. On the contrary, I have discovered that if the high pressure polymerization is properly controlled, less highly condensed material is deposited on the catalyst and in consequence the life of the catalyst is longer than is normally the case in low pressure phosphoric acid polymerization.

I believe that the reason for this improvement which I have discovered, is mainly due to the better solvent action of the gases at the higher pressures on highly condensed hydrocarbon molecules which slows up their rate of deposition in the catalyst. It is known that the solvent action of gases on such substances increases with the density of the gas. Therefore, in order that the compressed gases may be capable of dissolving or keeping in solution highly condensed material which will always form as a by-product in the polymerization, it is necessary that a certain minimum pressure be employed, which minimum is different for different gases, and which also varies with the temperature. I have found that within the temperature range most suitable for phosphoric acid polymerization, i. e. about 435 to 475° F., this minimum for $C_3$ hydrocarbons is of the order of 1000 lbs. With increasing pressures up to about 2000 lbs. the improvement continues to rise, however about about 2000 lbs. further pressure increments have but little effect. For $C_4$ hydrocarbons a minimum pressure of 600 to 800 pounds is required, while above about 1200 pounds no marked additional benefits can be noted. Mixtures of $C_3$ and $C_4$ hydrocarbons require minimum and maximum pressures between the above limits. $C_5$ hydrocarbons have considerable solvent action from about 500 pounds on up. $C_2$ hydrocarbons are not usually polymerized by themselves, but only in conjunction with olefins of a greater number of carbon atoms, e. g. together with propylene.

In carrying out the phosphoric acid polymerization, accurate temperature control is essential. If the temperature is below about 425° F. polymerization is slow and incomplete. If the temperature is allowed to rise to about 500° F. or higher even for short periods of time, the catalyst is quickly ruined. Now by operating under the increased pressures of my invention, the problems of temperature control are greatly magnified. I have found that increases in hot spot temperatures in the catalyst bed mount greatly with increases in operating pressures over the range investigated, and the difficulties of preventing temperatures to rise locally above about 500° F. mount proportionally. In order to enable proper temperature control under these conditions, I have found it necessary in the high pressure polymerization of normally gaseous olefinic hydrocarbon mixtures containing amounts of olefins sufficient for commercial polymerization, e. g. not less than about 15% to employ catalyst chambers in which the maximum distances from any cooling surface in at least the inlet section is not more than 3 inches. On the other hand I have found that it is not practical to use chambers in which this maximum distance is less than 2 inches because there is a strong tendency of plugging with tubes of smaller diameters. It is necessary that the cooling surfaces be maintained at a certain temperature from the outside. Thus, one side of the surface must be in contact with a cooling fluid having a temperature not more than 100° F. and preferably about 40 to 75° F. below the desired operating temperature, for example water in equilibrium with steam maintained under a pressure of about 150 to 400 lbs. and preferably 300 pounds.

Chambers most suitable for our purpose are jacketed cylindrical tubes having an inside diameter of 4 to 6 inches; or 3 concentric tubes, the outside tubes and preferably the center tube as well containing cooling fluid, and the annular space between the center and outside tubes being filled with catalyst. If desired the tubes may carry external and/or internal fins to increase the rate of heat transfer, although internal fins are less desirable because of difficulties in cleaning.

In addition to the above limitation it is important that the rate of feed be maintained between certain limits. The rate of feed may be expressed in terms of gallons liquefied feed/lb. of catalysts/hour. I have found that unless the rate of feed is at least .25 gal./lb./hr., tarry substance tends to deposit rapidly on the catalyst despite high pressures, possibly because of a minimum requirement of combination solvent power and linear velocity of the reaction gases through the bed which is necessary to keep the tarry material from depositing. On the other hand, feed rates may not exceed about .9 gal./lb. catalyst/hr. because of incomplete polymerization and considerable operating difficulties such as plugging.

Feed rates in turn determine the minimum length of the catalyst chamber, for below this minimum, if a practical percentage of polymerization is to take place, the rate of feed must be so slow as to cause deposition of tarry material, channeling, incomplete conversion, etc. I find that for this reason lengths below about 20 feet are not practical in this process. On the other hand, the maximum length of the catalyst chamber is determined by the excessive pressure drops occurring in long chambers with consequent plugging of the longer chambers. This maximum I find to be about 60 feet.

The olefin content of gases available for feed is rarely above 50% olefins and is usually between about 20 and 50% olefins. Such feeds are readily handled by apparatus of my dimensions under the conditions described above. However, benefits are derived for feeds having lower amounts of olefins down to limits which prevent economical polymerization by means of $H_3PO_4$, i. e. 15%.

Ease of temperature control is further affected by the heat profile through the length of the reaction chamber. With fresh catalyst most of the reaction is concentrated in the inlet section so that the peak temperature is high and located close to the inlet. This high temperature causes more rapid loss of catalyst activity in the inlet zone than the remaining catalyst which is at a lower temperature so the proportion of the reaction taking place in this zone gradually declines. As a result, the peak temperature moves along the tube away from the inlet. It also drops in height because the catalyst in the inlet zone is not completely deactivated in the substantial absence of catalyst poisons, but merely reduced in activity so that it continues to polymerize part of the olefin contained in the feed, thus reducing the quantum to be reacted by successive portions of the catalyst. Thus, when the catalyst is fresh, the peak temperature is near the inlet and may be as high as 90° F. or more above the average temperature while at about half the useful life of the catalyst this would occur at a point closer to the outlet and may for instance be about 25° F.

In view of the heat profile according to which the highest temperature peaks occur in the inlet section of the chamber, I may modify the shape of the chamber to produce superior results in several ways. By inlet section I mean about 20% of the total length of the reaction chamber.

I have found that by using a reaction chamber in which the minimum distance from any point to the nearest cooling surface of the inlet portion is smaller than that of the remaining portion of the chamber, the temperature throughout the length of the chamber may be very closely controlled and simultaneously the danger of plugging is greatly reduced. Such a design allows maximum heat transfer in the region of greatest reaction velocity where the danger of catalyst injury is at a maximum. Thus, tubes of a relatively small and relatively large diameter may be joined so that, for instance, the first third of the reaction chamber may have an inside radius of 2 inches, the second third of 2½ inches, and the last third of 3 inches or even more, but preferably not over 5 inches.

Another method by which the same result may be achieved is the use of a core, through which cooling medium may be circulated, inserted into the inlet portion of the reaction chamber and extending into it preferably not less than 20%.

for example to about 30 to 50% of the total length of the chamber.

While in the above I have described a method for high pressure polymerization which for operativeness depends on the dimensions of the catalyst chamber, I have found that another method may be used in which the catalyst is admixed with inert pieces of a conductor, such as metal nipples. Thus, by addition of a certain quantity of conducting diluent to the catalyst, the reaction may be diluted and the heat transfer increased so that somewhat larger reaction chambers may be safely used. Very close control may be exercised through this method by changing the concentration of the conductor scattered through the catalyst over the length of the reaction chamber, the highest concentration of conductor and lowest concentration of catalyst being in the inlet zone.

In the following descriptive examples the advantages of conditions, dimensions and results which characterize my invention, are demonstrated:

Example I

Average pressure_____ 1650 lbs. per sq. in.
Gas composition_____ 33-37% propylene
Average catalyst temperature _____ 445-465° F.
Average feed rate_____ 0.45 gal. per lb. catalyst per hour
Dimensions of reactions:
  Inside diameter____ 5.189 inches
  Length of tube_____ 40 feet
Results:
  % Propylene polymerized_____ 85%
  Catalyst life_____ 130 gals. polymerized per lb. catalyst consumed without regeneration

Example II

Average pressure_____ 1050 lbs. per sq. inch
Gas composition_____ 26-28% n-butylenes. No isobutylene
Average catalyst temperature _____ 445-465° F. average temperature
Average feed rate_____ 0.65 gal. per lb. catalyst per hour
Dimensions of reactor:
  Inside diameter ___ 4.562 inches
  Length of tube___ 40 feet
Results:
  % Butylenes polymerized_____ 80%
  Catalyst life_____ 130 gals. polymerized per lb. catalyst consumed without regeneration The butylenes polymerized were hot acid residual butylenes.

Referring to the attached drawing which represents a sketch of a suitable reaction chamber containing a catalyst bed, a vertical cylindrical shell 1 of 6 inches maximum diameter and of 20 to 60 feet in length is surrounded by the cylindrical jacket 2, leaving an annular space 3 between the two cylindrical shells. The upper and lower ends of cylinder 1 are fitted with suitable closures as at 4 and 5 having ingress and egress conduits 6 and 7, respectively.

Feed gases enter the reaction chamber 1 through the conduit 6 under pressure and pass downward through the phosphoric acid catalyst bed 8. A mixture of polymerized and unpolymerized gases are removed from the reaction chamber through conduit 7 and passed to a separator not shown.

Water, the cooling medium, enters the annular space 3 through line 9, which communicates with said space 3. A predetermined liquid level is maintained near the top by operation of valve 10. Steam generated in annular space 3 by the heat of reaction is vented through valved line 11, and sufficient back pressure to control the boiling temperature of the water within the desired limits is maintained by means of a partially closed valve 12 in line 11.

I claim as my invention:

1. A process for polymerizing normally gaseous olefins of 3 to 5 carbon atoms which comprises contacting said hydrocarbons with a solid phosphoric acid catalyst at a pressure between 600# and 2000#/sq. in. and a temperature between 425° F. and 500° F. by passing them through an elongated reaction zone filled with said catalyst, at a rate of .25 to .9 gallon of liquid mixture per pound of catalyst per hour and under conditions to prevent formation of hot spots having temperatures above 500° F. and to prevent clogging, said zone being bounded by cooling surface maintained at a temperature not more than 100° F. below the polymerization temperature maintained in said zone.

2. The process of claim 1 in which the temperature is between 435° F. and 475° F.

3. The process of claim 1 in which the cooling surface is maintained not more than 40° F. to 75° F. below the polymerization temperature.

4. A process for polymerizing normally gaseous olefins of 3 to 5 carbon atoms which comprises contacting said hydrocarbons with a solid phosphoric acid catalyst at a pressure between 600# and 2000#/sq. in. and a temperature between 425° F. and 500° F. by passing them through an elongated reaction zone filled with said catalyst at a rate of .25 to .9 gallon of liquid mixture per pound of catalyst per hour, and under conditions to prevent clogging caused by migration of the catalyst during the reaction, said zone being bounded by cooling surfaces maintained at a temperature not more than 100° F. below the polymerization temperature maintained in said zone, the longest distance from any point of the catalyst mass within the reaction zone to the nearest cooling surface being between the limits of 2 to 3 inches.

5. A process for polymerizing normally gaseous olefins of 3 to 5 carbon atoms which comprises contacting said hydrocarbons with a solid phosphoric acid catalyst at a pressure between 600# and 2000#/sq. in. and a temperature between 425° F. and 500° F. by passing them through an elongated reaction zone filled with said catalyst at a rate of .25 to .9 gallon of liquid mixture per pound of catalyst per hour, and under conditions to prevent clogging caused by migration of the catalyst during the reaction, said zone being bounded by cooling surfaces maintained at a temperature not more than 100° F. below the polymerization temperature maintained in said zone, the longest distance from any point of the catalyst mass within the inlet section only of the reaction zone to the nearest cooling surface being between the limits of 2 to 3 inches.

6. A process for polymerizing propylene which comprises contacting said propylene with a solid phosphoric acid catalyst at a pressure between 1000# and 2000#/sq. in. and a temperature between 425° F. and 500° F. by passing them through an elongated reaction zone filled with said catalyst, at a rate of .25 to .9 gallon of liquid mixture per pound of catalyst per hour and under conditions to prevent formation of hot spots having temperatures above 500° F. and to prevent clogging, said zone being bounded by cooling surfaces maintained at a temperature not more than 100° F. below the polymerization temperature maintained in said zone.

7. A process for polymerizing butylene which comprises contacting said butylene with a solid phosphoric acid catalyst at a pressure between the limits of 600# to 1200#/sq. in. and a temperature between 425° F. and 500° F. by passing them through an elongated reaction zone filled with said catalyst, at a rate of .25 to .9 gallon of liquid mixture per pound of catalyst per hour and under conditions to prevent formation of hot spots having temperatures above 500° F. and to prevent clogging, said zone being bounded by cooling surfaces maintained at a temperature not more than 100° F. below the polymerization temperature maintained in said zone.

WILLIAM P. GAGE.